(12) United States Patent
Jin et al.

(10) Patent No.: US 8,856,469 B2
(45) Date of Patent: Oct. 7, 2014

(54) APPARATUS AND METHOD FOR LOGGING OPTIMIZATION USING NON-VOLATILE MEMORY

(75) Inventors: Hee-Gyu Jin, Suwon-si (KR); Kyoung-Gu Woo, Seoul (KR); Hyung-Gyu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 12/839,509

(22) Filed: Jul. 20, 2010

(65) Prior Publication Data

US 2011/0072207 A1    Mar. 24, 2011

(30) Foreign Application Priority Data

Sep. 22, 2009 (KR) .......................... 10-2009-0089778

(51) Int. Cl.
*G06F 12/00* (2006.01)
*G06F 17/30* (2006.01)
*G06F 11/14* (2006.01)

(52) U.S. Cl.
CPC ...... *G06F 17/30368* (2013.01); *G06F 11/1441* (2013.01)
USPC ................ 711/161; 711/4; 711/118; 711/162

(58) Field of Classification Search
USPC .......................... 711/4, 118, 4.118, 161, 162
See application file for complete search history.

(56) References Cited

U.S. PATENT DOCUMENTS

| | | | |
|---|---|---|---|
| 5,524,205 A | 6/1996 | Lomet et al. | |
| 5,951,695 A * | 9/1999 | Kolovson | ........................ 714/16 |
| 7,653,836 B1 * | 1/2010 | Chatterjee et al. | ............... 714/20 |
| 2002/0112094 A1 | 8/2002 | Pederson et al. | |
| 2004/0054644 A1 | 3/2004 | Ganesh et al. | |
| 2005/0005191 A1 * | 1/2005 | Judd | ................................. 714/5 |
| 2006/0206538 A1 | 9/2006 | Veazey | |
| 2010/0241790 A1 * | 9/2010 | Whang et al. | .................. 711/103 |

FOREIGN PATENT DOCUMENTS

| | | |
|---|---|---|
| KR | 10-1992-0001347 | 1/1992 |
| KR | 10-2008-0097078 | 11/2008 |
| WO | WO 2008/133373 | 11/2008 |

\* cited by examiner

*Primary Examiner* — Gurtej Bansal
(74) *Attorney, Agent, or Firm* — NSIP Law

(57) ABSTRACT

A logging optimization technology using a non-volatile memory is provided. A log record has a first link connected based on a page unit and a second link connected based on a transaction unit. The log record is stored in a non-volatile memory buffer. The log record stored in the non-volatile memory buffer is deleted or moved to a disk, if necessary.

20 Claims, 13 Drawing Sheets

FIG.2

| TxnID | LogType | LogID | PageID | LogData | prevLog | nextLog | NextRedoLog | NextUndoLog | PrevUndoLog |~201

| prevLSN | TxnID | LogType | LogID | PageID | LogData |~202

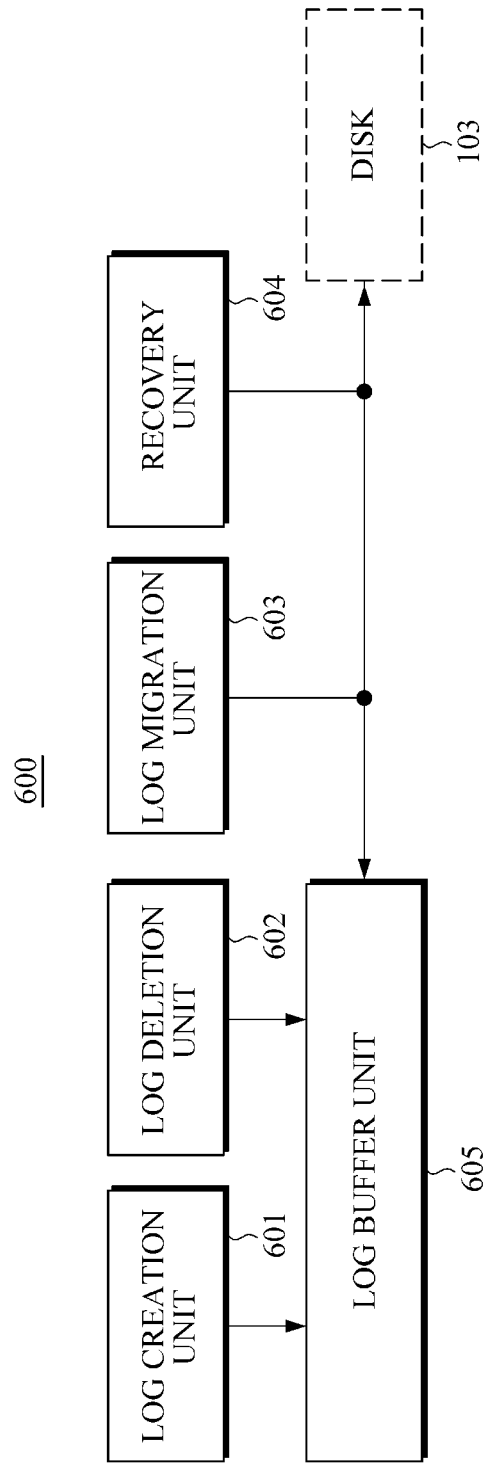

FIG.7A

Page #1

| | 000 | | 000 | | 000 | |
|---|---|---|---|---|---|---|
| | 10 | | 20 | | 30 | |

Page #2

| | 000 | | 000 | | 000 | |
|---|---|---|---|---|---|---|
| | 10 | | 20 | | 30 | |

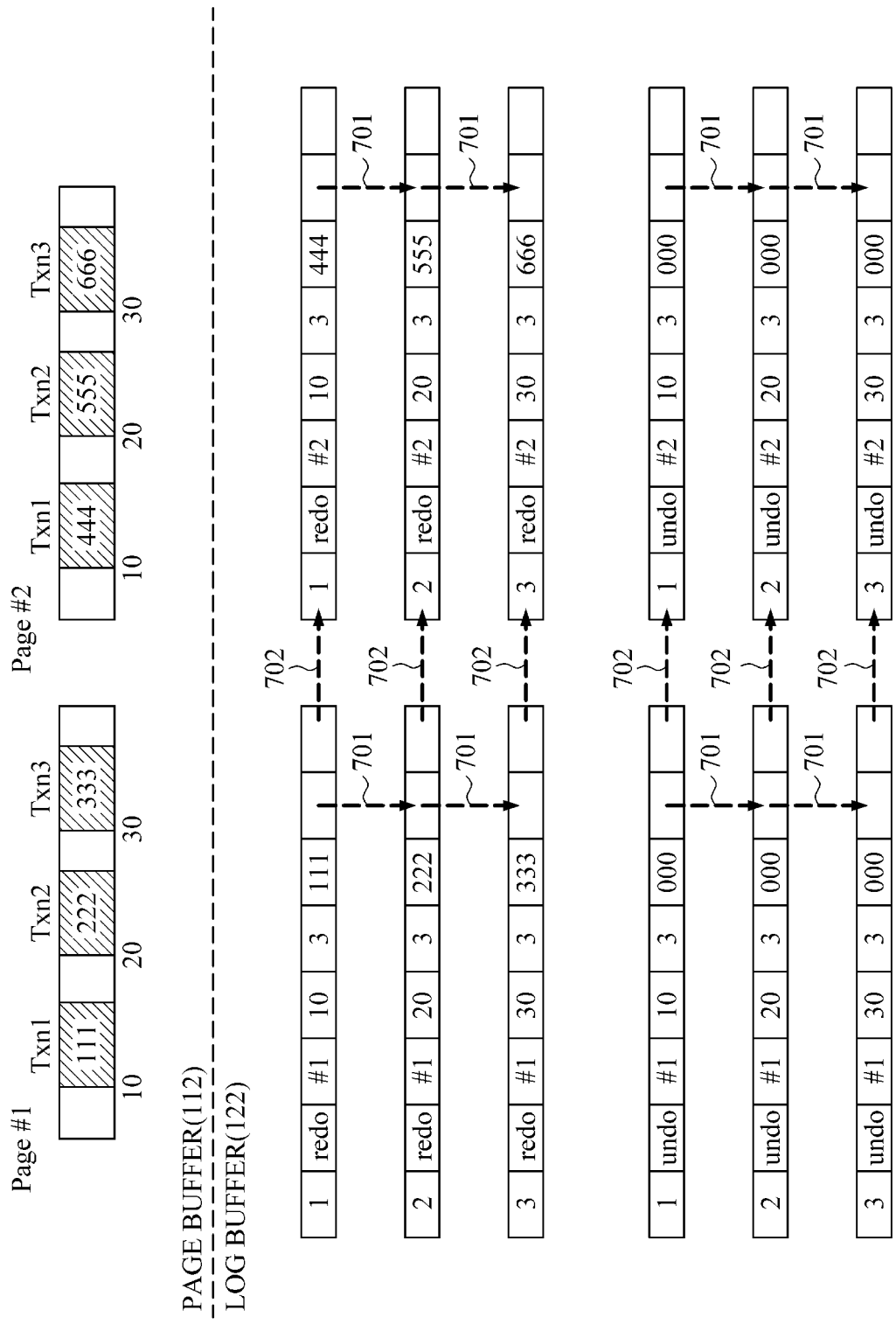

APPARATUS AND METHOD FOR LOGGING OPTIMIZATION USING NON-VOLATILE MEMORY

CROSS-REFERENCE TO RELATED APPLICATION(S)

This application claims the benefit under 35 U.S.C. §119(a) of Korean Patent Application No. 10-2009-0089778, filed on Sep. 22, 2009, the disclosure of which is incorporated herein by reference in its entirety for all purposes.

BACKGROUND

1. Field

The following description relates to a logging technology for system recovery.

2. Description of the Related Art

In a general disk-based database, a disk input/output (I/O) occurs when a data read is performed on a particular page or a buffer replacement for data write or a transaction commit occurs. Such a disk I/O operation may cause the processing speed of a system to be slowed.

Meanwhile, logging is a representative technology for recovering data stored in a database. According to the logging technology, when any change occurs to data, contents before and after the change are stored in order for logs to be kept. Physically, a log is a file of updates done to the database, stored in non-volatile storage. If the database is found to be in an inconsistent state or was not previously properly shut down, the database logs can be reviewed for uncommitted transactions changes made by these transactions can be undone. Additionally, transactions that are already committed but for which changes did not yet appear in the database are redone.

However, in the logging technology, all logs generated in response to a data page being written to a disk or a transaction being committed need to stored in the disk, so frequent disk input/output (I/O) may be caused. In order to reduce the number of such a frequent disk I/O, a log buffer for storing log may be used.

By using the log buffer, logs are not directly written to the disk, but are written to the log buffer, so operations by disk I/O may be reduced. However even if the log buffer is used, the log buffer has a limited storage space, and, as such, the logs need to be periodically stored to the disk. That is, disk I/O generated when reflecting the logs stored in the log buffer to the disk also causes the logging performance to be lowered.

SUMMARY

In one general aspect, there is provided an apparatus for logging optimization using a non-volatile memory, the apparatus including: a log creation unit configured to create a log record including a first link connected based on a page unit, a log buffer unit including a non-volatile memory, and configured to store the created log record, and a log deletion unit configured to, in response to a data page stored in a page buffer being written to a disk, delete a is redo log record corresponding to the data page written to the disk from log records, the log records being stored in the log buffer unit.

The apparatus may further include that: the log record includes a second link connected based on a transaction unit, and the log deletion unit is further configured to, in response to a transaction that is being executed being committed, delete an undo log record corresponding to the committed transaction from the log records.

The apparatus may further include a log migration unit configured to, in response to the log buffer unit lacking a storage space: copy a log record stored in the log buffer unit to the disk, and delete the corresponding log record from the log buffer unit.

The apparatus may further include that the log migration unit is further configured to: assign the log record with an identifier indicating a creation order of the log record, and copy the log record to the disk.

In another general aspect, there is provided an apparatus for logging optimization using a non-volatile memory, the apparatus including: a log creation unit configured to create recovery information including at least one of: a log record including a first link connected based on a page unit, log information about a transaction being executed, log information about a page being updated, and link information about the log record, a log buffer unit including a non-volatile memory, and configured to store the created recovery information, and a log deletion unit configured to, in response to a data page stored in a page buffer being written to a disk, delete a redo log record corresponding to the page written to the disk from log records, the log records being stored in the log buffer unit.

The apparatus may further include that: the log record includes a second link connected based on a transaction unit, and the log deletion unit is further configured to, in response to a is transaction that is being executed being committed, delete an undo log record corresponding to the committed transaction from the log records.

The apparatus may further include a log migration unit configured to, in response to the log buffer unit lacking a storage space: copy a log record stored in the log buffer unit to the disk, and delete the corresponding log record from the log buffer unit.

The apparatus may further include that the log migration unit is further configured to: assign the log record with an identifier indicating a creation order of the log record, and copy the log record to the disk.

The apparatus may further include a recovery unit configured to perform a data recovery by use of the recovery information.

In another general aspect, there is provided a method for logging optimization using a non-volatile memory, the method including: creating a log record having a first link connected based on a page unit, storing the created log record in a log buffer unit formed of a non-volatile memory, and in response to a data page stored in a page buffer being written to a disk, deleting a redo log record corresponding to the data page written to the disk from log records, the log records being stored in the log buffer unit.

The method may further include: in response to a transaction that is being executed being committed, deleting an undo log record corresponding to the committed transaction from the log records, wherein the log record has a second link connected based on a transaction unit.

The method may further include, in response to the log buffer unit lacking a storage space: copying a log record stored in the log buffer unit to the disk, and deleting the corresponding log record from the log buffer unit.

In another general aspect, there is provided a method for log optimization using a non-volatile memory, the method including: creating recovery information including at least one of: is a log record having a first link connected based on a page unit, log information about a transaction being executed, log information about a page being updated, and link information about the log record, storing the created recovery information in a log buffer unit including a non-volatile memory, and in response to a data page stored in a page buffer being written to a disk, deleting a redo log record corresponding to the page written to the disk from log records, the log records being stored in the log buffer unit.

The method may further include: in response to a transaction that is being executed being committed, deleting an undo log record corresponding to the committed transaction from log records, wherein the log record has a second link connected based on a transaction unit.

The method may further include, in response to the log buffer unit lacking a storage space: copying a log record stored in the log buffer unit to the disk, and deleting the corresponding log records from the log buffer unit.

The method may further include performing data recovery by use of the recovery information.

Other features and aspects will be apparent from the following detailed description, the drawings, and the claims.

BRIEF DESCRIPTION OF THE DRAWINGS

FIG. 2 is an example of log records.
FIG. 6 is an example of an apparatus for logging optimization.
FIGS. 7A to 7D are an example of the creation and storing of a log record.

Figure 1:
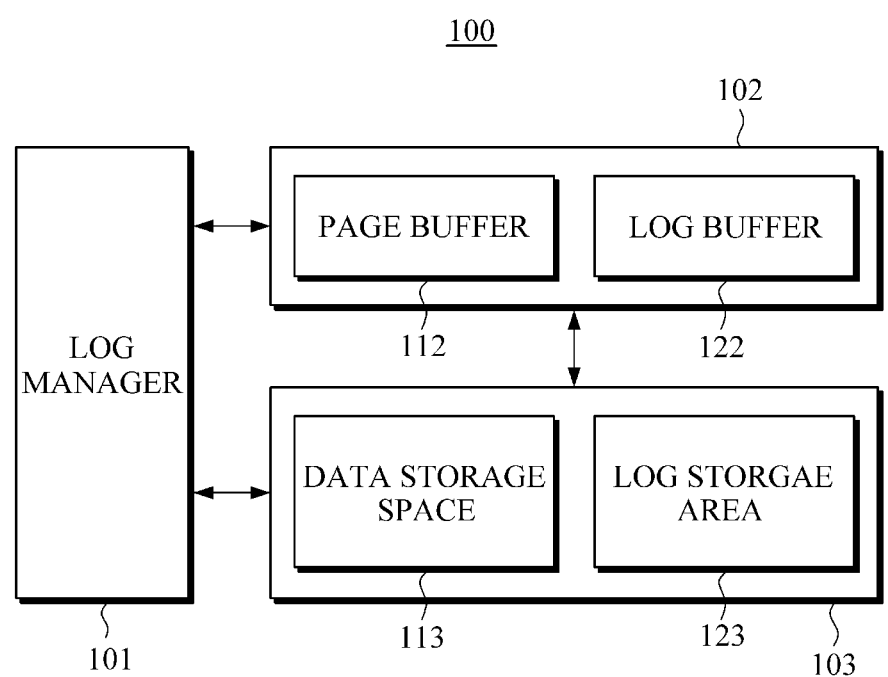
FIG. 1 is an example of a logging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Hereinafter, examples will be described with reference to accompanying drawings.

FIG. 1 shows an example of a logging system.

As shown in FIG. 1, a logging system 100 includes a log manager 101, a memory buffer 102, and a disk 103.

When an update is performed with respect to data on the memory buffer 102 and/or the disk 103, the log manager 101 may create a log record associated with the update and may manage the created log record. The log record may represent a file which records the content of change being performed on predetermined data according to data input/output commands. Accordingly, when a problem occurs in a system, the log manager 101 may recover the system by executing data recovery by use of the log record.

The memory buffer 102 may temporarily store data. The memory buffer 102 may include a page buffer 112 for temporarily storing data to be written to the disk 103 or data read from the disk 103, and a log buffer 122 for temporarily storing the created log record. The log buffer 122 may be implemented as a non-volatile memory which is capable of retaining the stored data upon power failure.

The disk 103 may be implemented as a hard disk for semi-permanentarly storing normal data and log records, and may be divided into a data storage space 113 for storing normal data and a log storage space 123 for storing log records.

For example, when an update is performed on page data of the page buffer 112, the log manager 101 may create an undo log record corresponding to the content before updating and a redo log record corresponding to the content after updating, and may store the generated log records in the log buffer 122. In addition, the log manager 101 may delete log records stored in the log buffer 122 or migrate log records to the log storage space 123 of the disk 103 to secure a storage space of the log buffer.

FIG. 2 shows an example of log records.

As shown in FIG. 2, a log record may include a log record 201 stored in the log buffer 122 and a log record 202 stored in the disk 103.

Hereinafter, data fields of the log record which are denoted as reference numeral 201 and stored in the log buffer 122 will be described.

"TxnID" is an identifier of a transaction. "LogType" represents the type of log record. LogType is classified into an "Undo" log record representing data before updating and a Redo log record representing data after updating. "LogID" is an identifier indicating a creation order of a log record. "PageID" is an identification of an updated page. "LogData" represents a content of updated data. The field of LogData may include the location of a page having the updated data and the length of the updated data. The field "prevLog" is a pointer pointing to a previous log record, and "nextLog" is a pointer pointing to a next log record. "NextRedoLog" is a pointer used to connect redo logs based on a page unit and used to point to a next redo log generated based on the same page. "NextUndoLog" and "PrevUndoLog" are pointers used to connect log records based on a transaction unit and used to point to a next undo log and a previous undo log that are generated based on the same transcation.

A CLR (compensation log record) may further include fields including "UndoNxtLog" serving as a pointer pointing to an undo log record to be performed next and an "UndoNxtLSN" corresponding to a log sequence number (LSN) indicating an undo log record to be performed next. A CLR is a log record created during a roll back process and also represents a redo log record corresponding to a log record which is made for undo operation.

Hereinafter, data fields of the log record which are denoted as reference numeral 202 and stored in the disk 103 will be described.

TxnID, LogType, LogID, PageID and LogData are identical to those described above with respect to reference numeral 201. "prevLSN" represents a LSN of a previous log record which is created by the same transaction. In addition, the CLR may further include an UndoNxtLSN corresponding to a LSN indicating an undo log record to be performed next.

According to an example of an apparatus for logging optimization, the log manager 101 may be capable of creating and managing recovery information including the log record described above. The recovery information may include log information about a transaction is being executed, log information about a page being updated and link information about the log record in addition to the log record described above.

Figure 3:
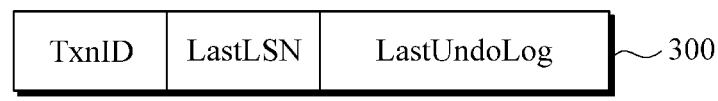
FIG. 3 is an example of transaction information.

FIG. 3 shows an example of log information about a transaction.

Referring to FIG. 3, log information about a transaction may be implemented in a transaction table 300 which contains information regarding a transaction being executed. The transaction table 300 may include data fields shown in FIG. 3. "TxnID" is an identifier of a transaction. "LastLSN" represents an LSN of the last log record existing in the disk 103 among log records created based on the same transaction. "LastUndoLog" is a pointer pointing to the last undo log existing in the log buffer 122 among undo log records created based on the same transaction.

For example, when a transaction starts, the log manager 101 may add transaction information to the transaction table 300. When a transaction is committed, the log manager 101 may remove the corresponding transaction information from the transaction table 300. In this manner, information about a transaction currently being executed may be retained in the transaction table 300, so an undo operation on a transaction which is not committed may be performed with reference to the transaction table 300 in a data recovery process.

Figure 4:
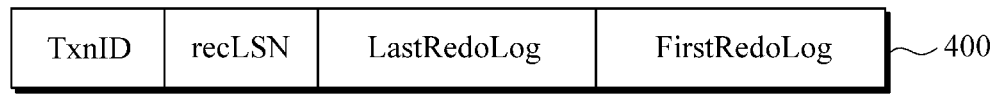
FIG. 4 is an example of page information.

FIG. 4 shows an example of log information about a page.

As shown in FIG. 4, log information about a page may be implemented in a dirty page table 400 which contains information about a page to which a change occurs. The dirty page table 400 may include data fields as follows. "TxnID" is an identifier of a transaction. "recLSN" represents a log sequence number of a page when the corresponding page is modified first. "LastRedoLog" is a pointer pointing to the last redo log record about the corresponding page. "FirstRedoLog" is a pointer pointing to the first redo log record about the corresponding page.

For example, in response to data of the page buffer 112 being modified, the log manager 101 may add information about the corresponding page to the dirty page table 400. Sequentially, in response to a predetermined page of the page buffer 112 being written to the disk 103, the log manager 101 may remove the information about the corresponding page. In this manner, since information about a page currently being modified may be retained in the dirty page table 400, a redo operation on the page existing on the dirty page table 400 may be performed in a data recovery process.

Figure 5:
FIG. 5 is an example of link information.

FIG. 5 shows an example of link information about a log record.

Referring to FIG. 5, link information about a log record may be implemented as a log link table 500 representing first log records or last log records of log records stored in the log buffer 122 in the form of a list. The log link table 500 may include data fields as follows. "FirstRedoLogRecord" represents the oldest redo log record among log records stored in the log buffer 122. "LastRedoLogRecord" represents the newest redo log record among log records stored in the log buffer 122. "FirstUndoLogRecord" represents the oldest undo log record among log records stored in the log buffer 122. "LastUndoLogRecord" represents the newest undo log record among log records stored in the log buffer 122.

FIG. 6 shows an example of an apparatus for logging optimization.

As shown in FIG. 6, a logging optimization apparatus 600 may include a log creation unit 601, a log deletion unit 602, a log migration unit 603, a recovery unit 604, and a log buffer unit 605.

The log creation unit 601 may create a log record to be stored in the log buffer unit 605. The created log record may have a first link connected based on a page unit and a second link connected based on a transaction unit. In addition, the log record may include an undo log record corresponding to a record before updating and a redo log record corresponding to a record after updating. The first link is capable of connecting log records based on a page unit, and the first link may connect created redo log records based on a page unit. For example, referring again to FIG. 2, the first link may correspond to the data field of NextRedoLog. The second link is capable of connecting log records based on a page unit, and the second link may connect created undo log records based on a page unit. For example, referring again to FIG. 2, the second link may correspond to the data field of NextUndoLog or PrevUndoLog. However, the first link and the second link may connect log records regardless of the type of log records.

In addition, the log generation unit 601 may create recovery information including a log record. The recovery information may include a log record described above with respect to FIGS. 2 to 5, log information about a transaction being executed, log information about a page being updated, and link information about the log records.

The log record or the recovery information including the log record that is created by the log creation unit 601 may be stored or managed in the log buffer unit 605. The log buffer unit 605 may be implemented using a non-volatile memory and may correspond to the log buffer 122 described above.

The log deletion unit 602 may delete the log records stored in the log buffer unit 605 according to external request. For example, in response to a data page stored in the page buffer 112 being written to the disk 103, the log deletion unit 602 may delete a redo log record corresponding to the page written to the disk 103 from log records stored in the log buffer unit 605. In addition, in response to a transaction that is being executed being committed, the log deletion unit 602 may delete an undo log record corresponding to the committed transaction from log records stored in the log buffer unit 605. For example, a redo log record corresponding to the page written to the disk 103 may be selected through the first link and an undo log record corresponding to the committed transaction may be selected through the second link.

In response to the log buffer unit 605 lacking a storage space, the log migration unit 603 may copy log records stored in the log buffer unit 605 to the log storage space 123 of the disk 103 and delete the corresponding log records from the log buffer unit 605. For example, the log migration unit 603 may assign the log record with an identifier, for example, a time stamp, indicating a creation order of the log record and may migrate the log record to the log storage space 123 of the disk 103. The identifier indicating the creation order of the log record may correspond to the data field LogID shown in FIG. 2.

The recovery unit 604 may perform a data recovery by use of the recovery information. For example, in performing a data recovery by use of the log record, the recovery unit 602 may perform an undo operation only on a transaction which is not committed, with reference to log information about transaction being executed. The recovery unit 602 may perform a redo operation only on a page to which an update occurs, with reference to log information about pages being updated. In addition, when a redo step is performed in the data recovery, the redo step may start by use of the lowest value among recLSNs of the dirty page table 400 or a FirstRedoLogRecord value of the log link table 500. In addition, an undo step may be performed in the data recovery, for example, starting from the largest log record among LastUndoLogs of the transaction table 300.

As described above, the log creation unit 601 may create and store log records having a link structure, and the log deletion unit 602 and the log migration unit 603 may remove unnecessary log records, securing storage space in the log buffer unit 605 and reducing the amount of operation processes required when log records are written to the disk 103. In addition, since the recovery unit 604 may perform data recovery by use of the recovery information, the recovery analysis step may be omitted.

FIGS. 7A to 7D show an example of the creation and storing of a log record.

In FIG. 7A, a page #1 and a page #2 represent pages of the page buffer 112. Initially, it is may be presumed that data of each page is "000".

Figure 7B:
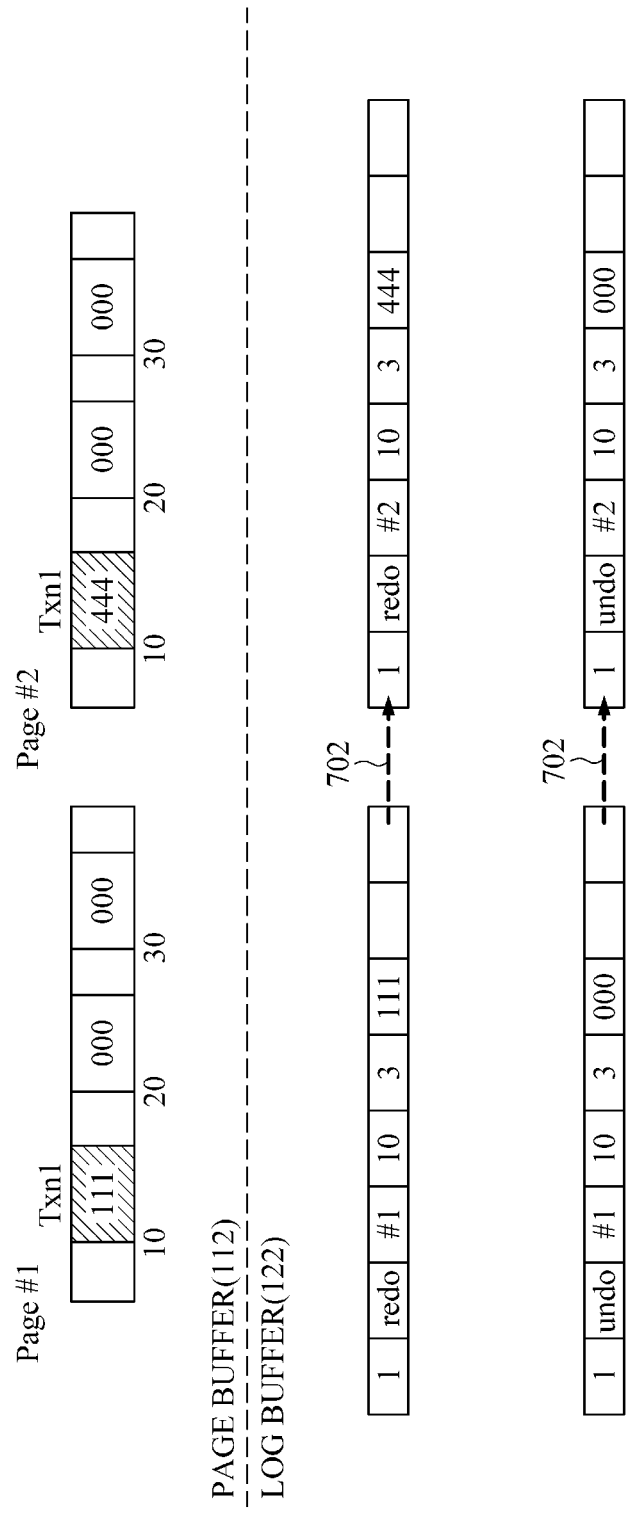

In FIG. 7B, as a transaction #1 (Txn1) is executed, data corresponding to the location of offset 10 in the page #1 may be changed from "000" to "111", and data corresponding to the location of offset 10 in the page #2 may be changed from "000" to "444". For example, log records may be created as shown in FIG. 7B, in which redo log records are connected to each other through the second link 702 and undo log records are connected to each other through the second link 702. Alternatively, the undo log records may be connected to each other through only the second link 702.

Figure 7C:
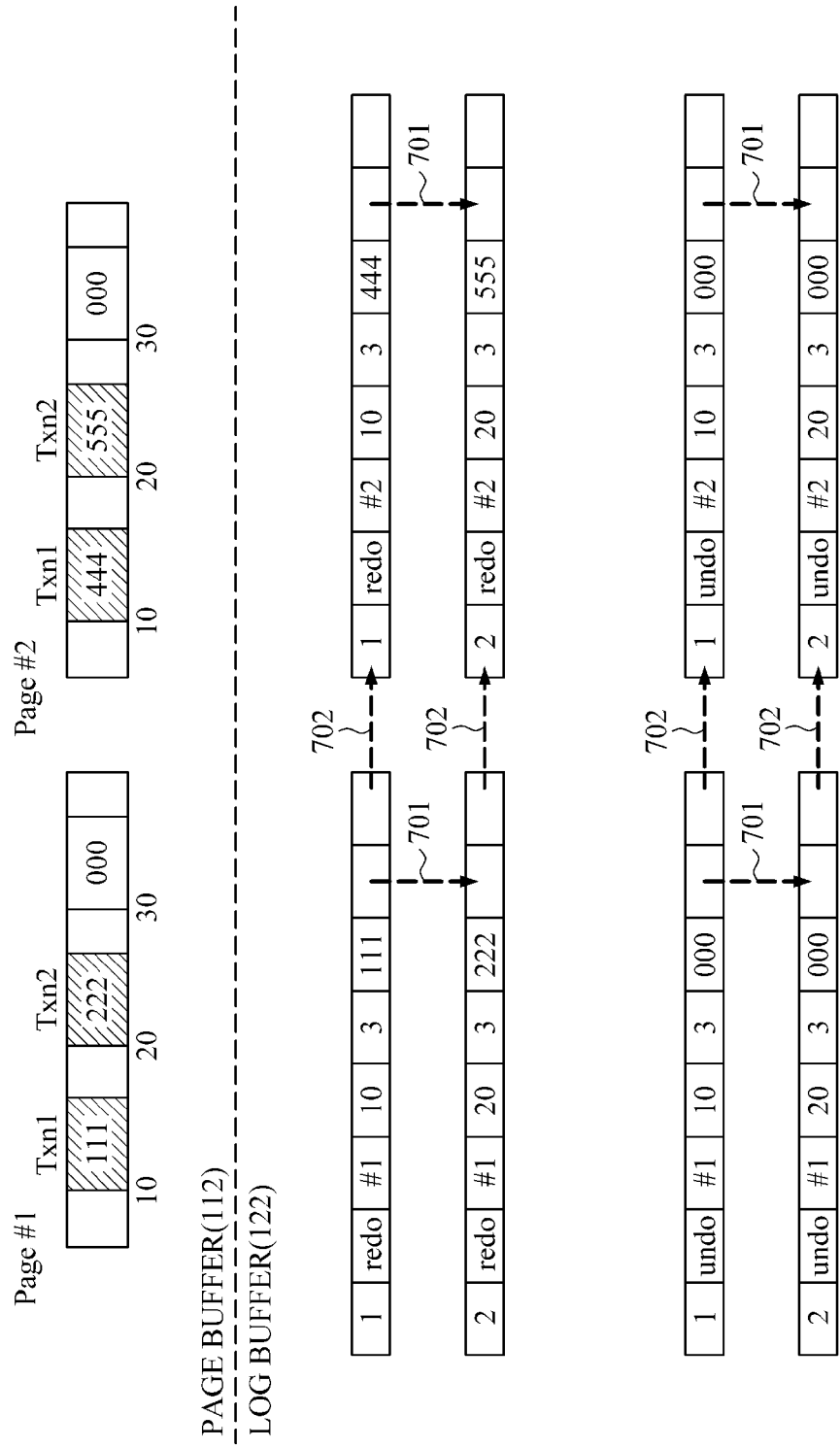

In FIG. 7C, as a transaction #2 (Txn2) is executed, data corresponding to the location of offset 20 in the page #1 may be changed from "000" to "222", and data corresponding to the location of offset 20 in the page #2 may be changed from "000" to "555". For example, log records may be created as shown in FIG. 7C, in which redo log records are connected to each other through the first link 701 and the second link 702 and undo log records are connected to each other through the first link 701 and the second link 702. Alternatively, the redo log records may be connected to each other through only the first link 701, and the undo log records may be connected to each other through only the second link 702.

In FIG. 7D, as a transaction #3 (Txn3) is executed, data corresponding to the location of offset 30 in the page #1 may be changed from "000" to "333", and data corresponding to the location of offset 30 in the page #2 may be changed from "000" to "666". For example, log records may be created as shown in FIG. 7D, in which redo log records are connected to each other through the first link 701 and the second link 702 and undo log records are connected to each other through the first link 701 and the second link 702. Alternatively, the redo log records may be connected to each other through only the first link 701, and the undo log records may be connected to each other through only the second link 702.

Figure 8A:
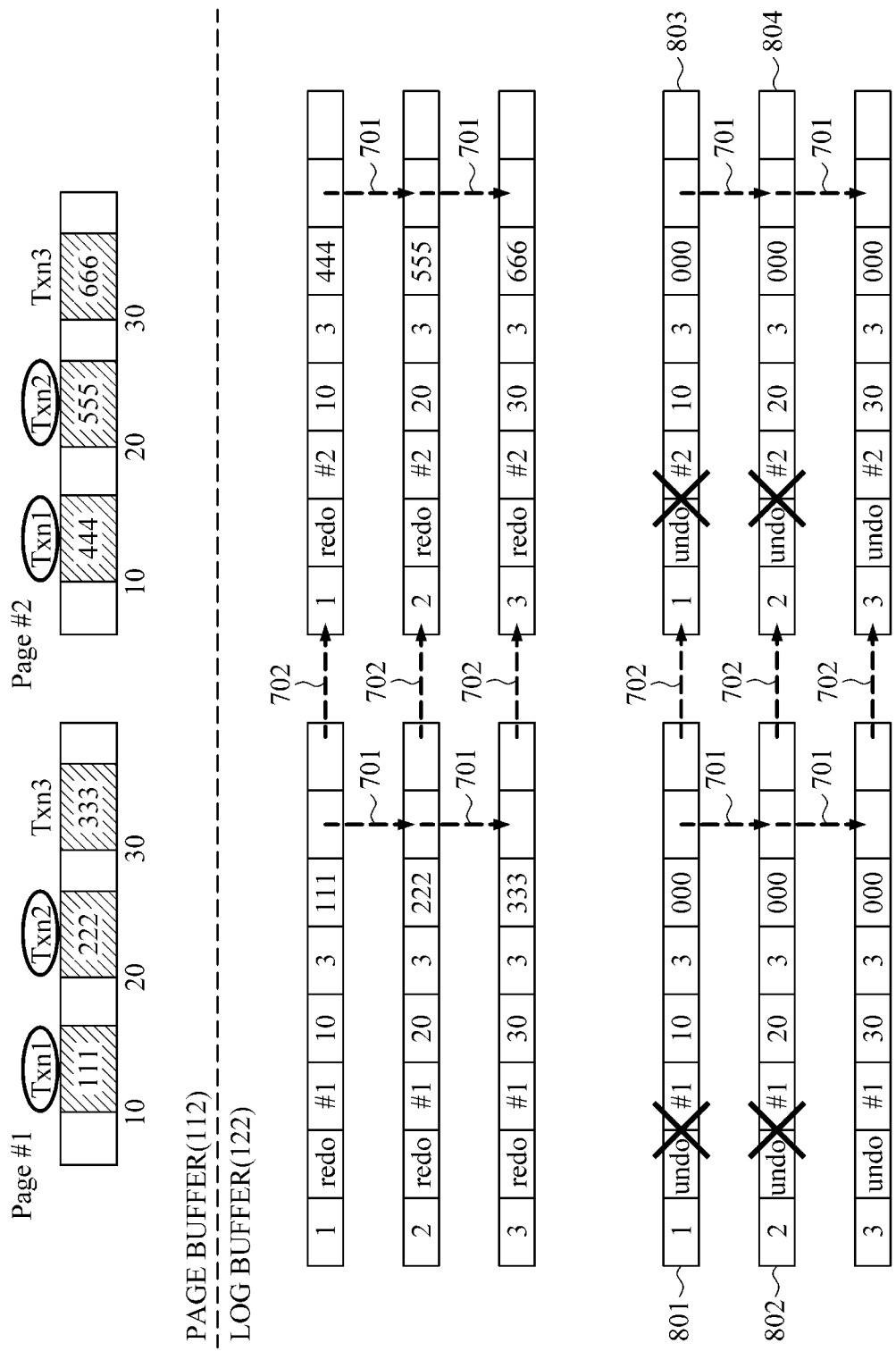
FIGS. 8A and 8B are an example of the deletion of a log record.
Figure 8B:
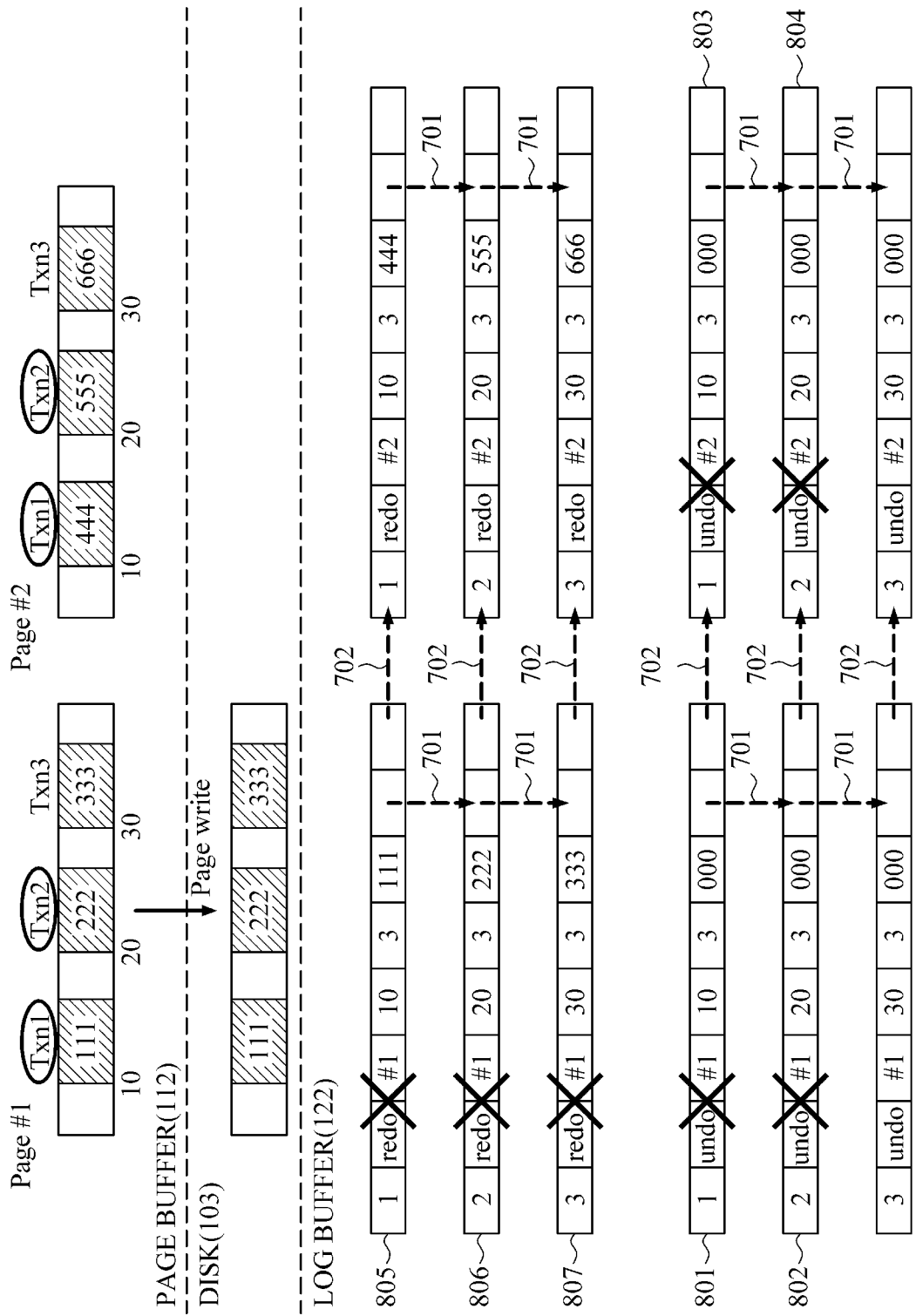

FIGS. 8A and 8B show an example of the deletion of a log record.

FIG. 8A shows an example of a log record optimization when the execution of a transaction is committed. For example, in FIG. 8A, when a transaction #1 and a transaction #2 are committed, undo log records 801 to 804 corresponding to the transaction #1 and the transaction #2 may be deleted from log records in the log buffer 122, as they may be no longer needed. Since a data recovery to a previous status is not required to be performed on a normally committed transaction, the undo log records of the corresponding transactions may be irrelevant. The second link 702 represents link information based on a transaction unit, so unnecessary undo log records may be quickly found through the second link 702.

FIG. 8B shows an example of log record optimization when a page write is performed. For example, in FIG. 8B, when data of a page #1 in the page buffer 112 is written to the disk 103, redo log records 805 to 807 corresponding to the page #1 may be deleted from log records in the log buffer 122. Since all changes of the modified page have been reflected in the disk 103, the redo log records may be irrelevant. The first link 701 represents link information based on a page unit, so unnecessary redo log records may be quickly found with reference to the first link 701.

Figure 9:
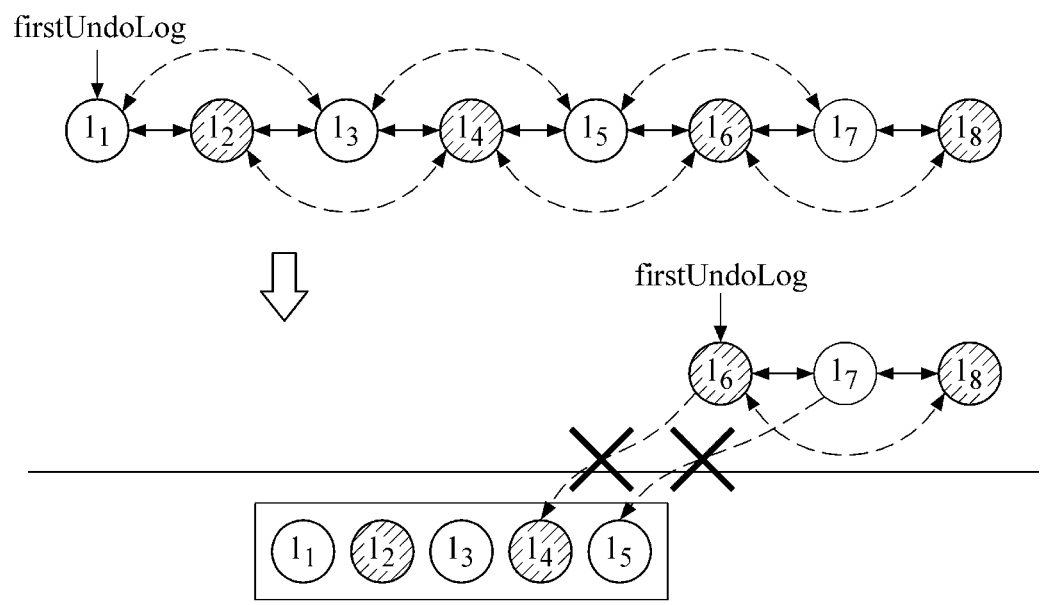
FIG. 9 is an example of the migration of a log record.

FIG. 9 shows an example of the migration of a log record.

As shown in FIG. 9, in response to the log buffer 122 lacking a storage space, a portion of the log record may be migrated into the disk 103. For example, the log migration unit 603 may select a predetermined log record and may convert the selected log record in a structure suitable for the disk 103. After that, the log migration unit 603 may copy the converted log record to the disk 103 and may delete the selected log record from the log buffer 122. The converting of log record structure may include converting a log record 201 to be stored in the log buffer 122 into a log record 202 to be stored in the disk 103, or assigning a log record with an identifier indicating the creation order of the log record. In addition, after the migration of the log record, the log migration unit 603 may modify LastLSN of the transaction table 300, FirstRedoLog information, and LastRedoLog information of the dirty page table 400, and all information of the log link table 500.

For example, in FIG. 9, it may be presumed that eight log records, including L1 to L8, exist and the migration of log records may be performed on the log records from L1 to L5. After the migration of log records, the log records from L1 to L5 may reside in the disk 103 and the log records from L6 to L8 may reside in the log buffer 122. After the migration of log records is performed, FirstUndoLogRecord of the log link table 500 may point to L6, and a link of L6, which had pointed to L4 as a previous log record before the migration, may not be available anymore. For example, after prevLog of L6 is initialized and LastLSN of a corresponding transaction of the transaction table 300 is modified into LSN of L4, the previous log record of L6 may be found through the modified information.

The migration of log records may be separately performed on each of the redo log record and undo log record. In response to a storage space for redo log records being separated from a storage space for undo log records, a parallel migration of log records may be achievable.

The older log record may be selected for earlier migration than the newer log record. Alternatively, the order of migration may be determined by the scale of log record or may be determined at random.

Figure 10:
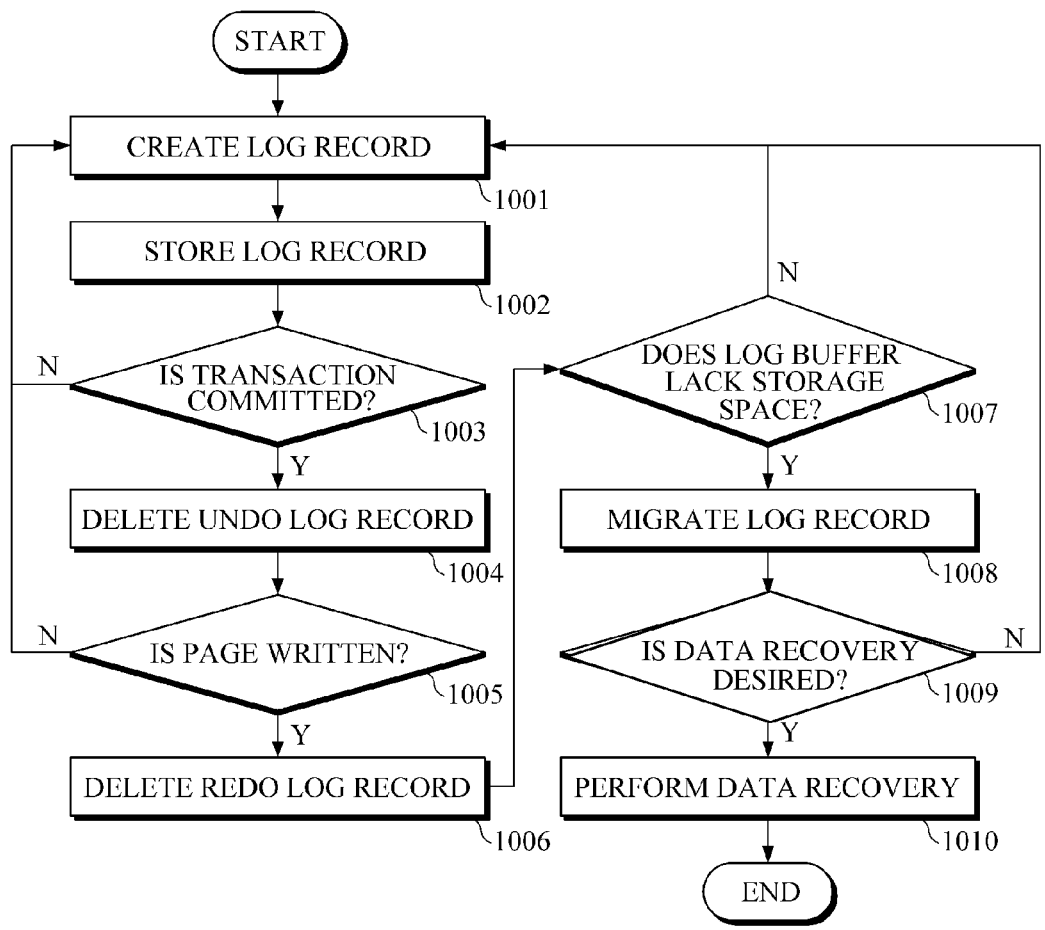
FIG. 10 is an example of a method for logging optimization.

FIG. 10 shows an example of a method for logging optimization.

As shown in FIG. 10, in operation 1001, the log manager 101 may create a log record to be stored in the log buffer 122. The created log record may have a first link connected based on a page unit and a second link connected based on a transaction unit. For example, the log creation unit 601 may create the log record 201 shown in FIG. 2. In addition, the log manager 101 may create recovery information including a log record. Examples of recovery information are described as shown in FIG. 2 to FIG. 5.

In operation 1002, the log manager 101 may store the created log record or the created is recovery information in the log buffer 122. For example, the log buffer unit 605 may store the log record or the created recovery information.

In operation 1003, the log manager 101 may determine whether a transaction being executed is committed. In operation 1004, in response to the transaction being executed being committed, the log manager 101 may delete an undo log record corresponding to the committed transaction from log records stored in the log buffer 122. For example, the log deletion unit 602 may delete the corresponding undo log record from the log buffer unit 605.

In operation 1005, the log manager 101 may determine whether a page write is executed. In operation 1006, in response to the page write having been executed, the log manager 101 may delete a redo log record for the corresponding page from redo log records stored in the log buffer 122. For example, the log deletion unit 602 may delete the corresponding redo log record from the log buffer unit 605.

In operation 1007, the log manager 101 may determine whether the log buffer 122 lacks a storage space. In operation 1008, in response to the log buffer 122 lacking a storage space, a particular log record may be migrated from the log buffer 122 to the log storage space 123 of the disk 103. For example, the log migration unit 603 may copy log records stored in the log buffer unit 605 to the log storage space 123 of the disk 103 and may delete the corresponding log records from the log buffer unit 605.

In operation 1009, the log manager 101 may determine whether data recovery needs to be executed. In operation 1010, in response to a data recovery being desired, the log manager 101 may execute data recovery by use of the recovery information. For example, the recovery unit 604 may execute a redo step with reference to the log record, the dirty page table 400, the log link table 500, etc. In addition, the recovery unit 604 may execute an undo operation with reference to the log record, the transaction table, etc.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

Flash memory devices and/or memory controllers may be included in various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. For example, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that may maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for logging optimization using a non-volatile memory, the apparatus comprising:
    a log creation unit configured to create a log record for data when the data is updated, the log record comprising an undo log record corresponding to a record before updating the data and a redo log record corresponding to a record after updating the data, the data being stored as a data page in a page buffer, the log record comprising a first link that connects the redo log record for the data page;
    a log buffer unit comprising a non-volatile memory and configured to store, in the non-volatile memory, the created log record with a plurality of log records stored in the non-volatile memory; and a log deletion unit configured to delete from the log records, in response to the data page being written to a disk, a redo log record identified by the first link and corresponding to the data page written to the disk.

2. The apparatus of claim 1, wherein:
the log record comprises a second link that connects undo log record for a transaction on the data; and
the log deletion unit is further configured to delete from the log record, in response to the transaction being committed, the undo log record identified by the second link and corresponding to the committed transaction.

3. The apparatus of claim 1, wherein the first link is a pointer, associated with a first redo log record of the data page, that points to another redo log record for the data page.

4. The apparatus of claim 1, further comprising:
a log migration unit configured to, in response to an indication that the log buffer unit lacks storage space:
copy a log record stored in the log buffer unit to the disk; and
delete the copied log record from the log buffer unit.

5. The apparatus of claim 4, wherein the log migration unit is further configured to:
assign an identifier to the log record, which is to be copied, that indicates a creation order of the log record; and
copy the log record to the disk.

6. An apparatus for logging optimization using a non-volatile memory, the apparatus comprising:
a log creation unit configured to create recovery information for data, the recovery information comprising at least one of:
a log record created for the data when the data is updated, the log record comprising an undo log record corresponding to a record before updating the data and a redo log record corresponding to a record after updating the data;
log information about a transaction being executed on the data;
log information about a page being updated; and
link information about the log record;
a log buffer unit comprising a non-volatile memory and configured to store the created recovery information and a plurality of log records in the non-volatile memory; and
a log deletion unit configured to delete from the log records, in response to the data stored as a data page stored in a page buffer being written to a disk, a redo log record identified by a first link that connects the redo log record for the data page and corresponding to the data page written to the disk.

7. The apparatus of claim 6, wherein:
the log record for the data comprises a second link that connects the undo log record for the transaction; and
the log deletion unit is further configured to delete from the log record, in response to the transaction being committed, the undo log record identified by the second link and corresponding to the committed transaction.

8. The apparatus of claim 6, further comprising a recovery unit configured to perform data recovery using the recovery information.

9. The apparatus of claim 6, wherein the first link is a pointer, associated with a first redo log record of the data page, that points to another redo log record for the data page.

10. The apparatus of claim 6, further comprising:
a log migration unit configured to, in response to an indication that the log buffer unit lacks storage space:
copy a log record stored in the log buffer unit to the disk; and
delete the copied log record from the log buffer unit.

11. The apparatus of claim 10, wherein the log migration unit is further configured to:
assign an identifier to the log record, which is to be copied, that indicates a creation order of the log record; and
copy the log record to the disk.

12. A method for logging optimization using a non-volatile memory, the method comprising:
creating a log record for data when the data is updated, the log record comprising an undo log record corresponding to a record before updating the data and a redo log record corresponding to a record after updating the data, the data being stored as a data page in a page stored in a page buffer, the log record having a first link that connects the redo log record for the data page;
storing, in a log buffer unit having a non-volatile memory, the created log record stored in the non-volatile memory; and
deleting, in response to the data page being written to a disk, the redo log record identified by the first link and corresponding to the data page written to the disk.

13. The method of clam 12, further comprising:
in response to a transaction that is being committed, deleting from the log record the undo log record, corresponding to the committed transaction, that is identified by a second link which connects the undo log record for the transaction.

14. The method of claim 12, further comprising:
in response to an indication that the log buffer unit lacks storage space:
copying a log record stored in the log buffer unit to the disk; and
deleting the copied log record from the log buffer unit.

15. The method of claim 12, wherein the first link is a pointer, associated with a first redo log record of the data page, that points to another redo log record for the data page.

16. A method for log optimization using a non-volatile memory, the method comprising:
creating recovery information for data, the recovery information comprising at least one of:
a log record created for the data when the data is updated, the log record comprising an undo log record corresponding to a record before updating the data and a redo log record corresponding to a record after updating the data;
log information about a transaction being executed on the data;
log information about a page being updated; and
link information about the log record;
storing, in a log buffer unit having a non-volatile memory, the created recovery information and a plurality of log records; and
in response to the data stored as a data page stored in a page buffer being written to a disk, deleting from the log record the redo log record identified by a first link that connects the redo log record for the data page and corresponding to the data page written to the disk.

17. The method of claim 16, further comprising performing data recovery using the recovery information.

18. The method of claim 16, wherein the first link is a pointer, associated with a first redo log record of the data page, that points to another redo log record for the data page.

19. The method of claim 16, further comprising:
in response to the executed transaction being committed, deleting from the log record the undo log record, corresponding to the committed transaction, that is identified by a second link which connects the undo log record for the transaction.

20. The method of claim 19, further comprising:
in response to an indication that the log buffer unit lacks storage space:
- copying a log record stored in the log buffer unit to the disk; and
- deleting the copied log record from the log buffer unit.

* * * * *